United States Patent

Schraff

[15] 3,648,058
[45] Mar. 7, 1972

[54] PROTECTIVE SWITCH DEVICE

[72] Inventor: Fred R. Schraff, 16526 St. Anthony, Cleveland, Ohio 44111

[22] Filed: Nov. 6, 1969

[21] Appl. No.: 874,633

[52] U.S. Cl. ..................................................307/10 AT
[51] Int. Cl. ..................................................H02g 3/00
[58] Field of Search.............................307/10 AT; 200/51.1

[56] References Cited

UNITED STATES PATENTS

| | | |
|---|---|---|
| 2,820,149 | 1/1958 | Roth..........................307/10 AT UX |
| 3,045,078 | 7/1962 | Frantz et al..........................200/51.1 |
| 3,160,761 | 12/1964 | Fuller..........................307/10 AT UX |
| 3,174,502 | 3/1965 | Howarth et al. ............307/10 AT UX |
| 3,222,534 | 12/1965 | Scott...........................307/10 AT UX |
| 3,194,970 | 7/1965 | Claps..................................307/10 AT |

*Primary Examiner*—David Smith, Jr.
*Attorney*—Teare, Teare & Sammon

[57] ABSTRACT

A switching device adapted for use in the ignition system of a motor vehicle including a socketlike mounting member adapted to be mounted in grounded relation on the motor vehicle. A pluglike switching member including a studlike portion adapted for insertion into said socketlike member, and contact means operably associated with said socketlike member and said pluglike member to effectively ground the ignition system in the noninstalled position of said pluglike member in said socketlike member.

1 Claims, 3 Drawing Figures

Patented March 7, 1972

3,648,058

INVENTOR
FRED R. SCHRAFF
BY
Heare, Heare, & Sammon
ATTORNEYS

PROTECTIVE SWITCH DEVICE

BACKGROUND OF THE INVENTION

The present invention relates to switching devices, and more particularly, to protective switching devices adapted for installation in the ignition system of a motor vehicle to effectively prevent unintended starting of an engine.

Recently, there have been numerous attempts to provide protective devices for preventing the theft of automobiles. These devices have taken on various forms with some being completely mechanical in construction, whereas, in other instances the devices have been adapted for interconnection with the ignition system of the motor vehicle. In any event, these devices have not proven to be entirely satisfactory. For example, the devices which have proven to be somewhat satisfactory are also quite costly to manufacture, whereas those devices which are inexpensive have not proven to be entirely reliable, and thus, do not provide the protection desired.

SUMMARY OF THE INVENTION

A switching device adapted for use in the ignition system of a motor vehicle comprising, a socket means adapted to be mounted in grounded relation on a motor vehicle, a switching means adapted for insertion into said socket means, and contact means operably associated with said socket means and said switching means for selectively grounding the ignition system in a noninstalled position of said switching means in said socket means.

The present invention contemplates providing a simple, rugged and highly effective switching device which can be inexpensively produced and quite easily installed on the motor vehicle. Although the device of the present invention is of a simple switchlike arrangement, it incorporates principles which enables the system to effectively prevent the "hot wiring" of a motor vehicle, and to cause sufficient delays in an attempted theft to discourage anyone who would attempt the same.

The device comprises a socketlike mounting member which is adapted for mounting in grounded relation on the motor vehicle. A pluglike switching member is provided which includes a studlike portion adapted for insertion into the socketlike member. The socketlike member includes a contact means which coacts with the stud portion and the socket member to ground out the ignition system of the motor vehicle engine to effectively prevent any unintended starting of the engine.

DESCRIPTION OF THE PREFERRED EMBODIMENTS

Figures 1, 2, 3:
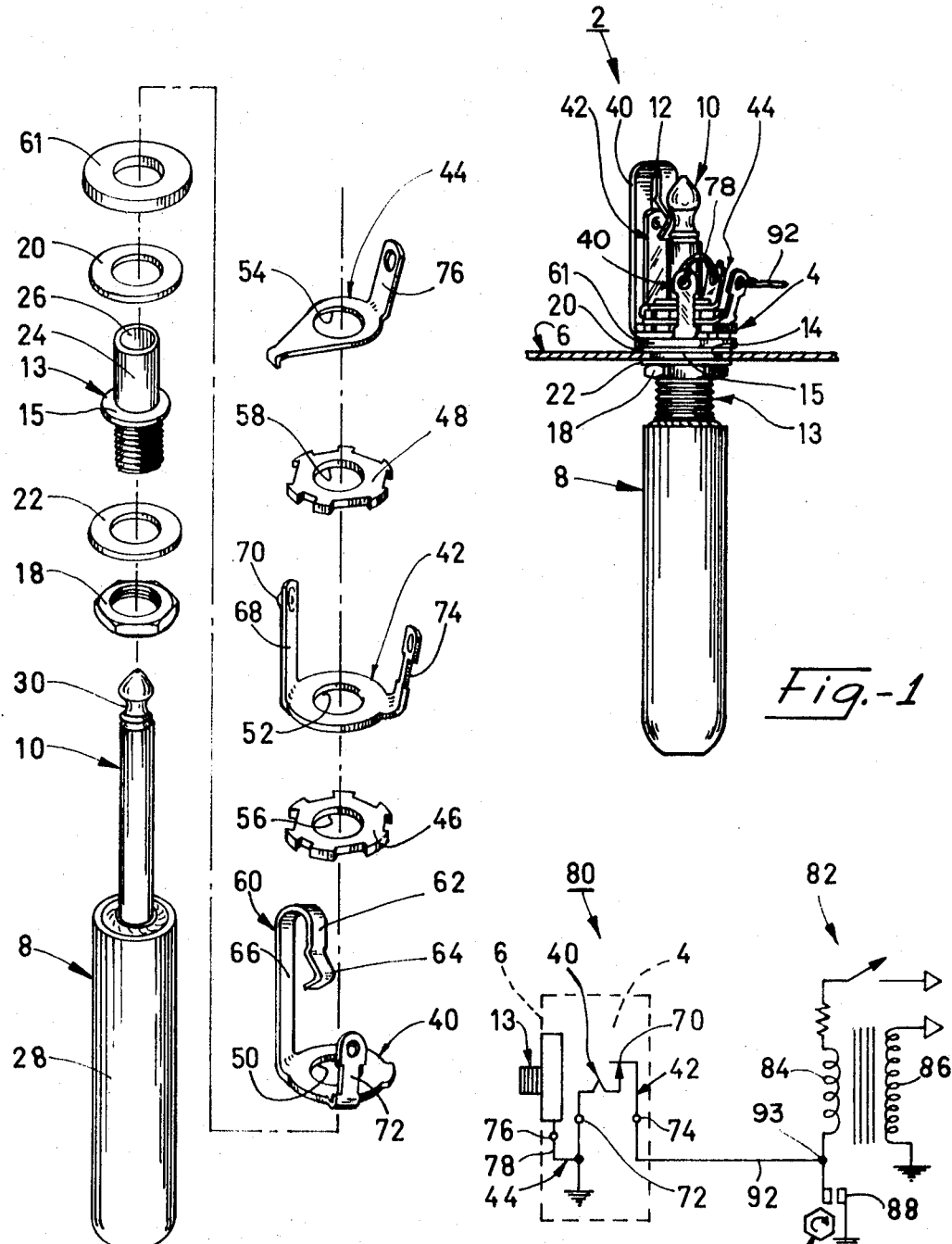
FIG. 1 is a side elevation view of the device of the present invention shown in mounted relation of a support member, such as the metal frame work of the motor vehicle.
FIG. 2 is an assembly view of the various parts of the device shown in FIG. 1.
FIG. 3 is a schematic diagram of a typical electrical circuit which may be employed in the present invention.

The device of the present invention is illustrated, generally at 2, in FIG. 1. As shown, the device includes a jacklike socket member 4 adapted for mounting on a support member 6, such as the framework of a motor vehicle. A pluglike switch member 8 is provided which includes a studlike portion 10 which is removably mounted within the socket member 4. The socket member 4 includes a contact means 12 disposed for snap-action coacting engagement with the stud member 10. The one side of the contact means 12 may be electrically connected to the ignition system while the other side of the contact means is electrically connected to the framework of the motor vehicle. By this arrangement, the disengagement of the switch member 8 from the socket member 4 will effectively ground out the ignition system to prevent operation of the engine of the motor vehicle.

In the forms shown, the socket member 4 preferably includes a tubelike sleeve portion 13 which is adapted for insertion into an aperture, as at 14, provided in the motor vehicle framework, such as by drilling or the like. The sleeve portion 13 may depend downwardly from a base portion 15 adapted to overly the top surface of the support member 6 for seated engagement therewith. The protruding lower end of the sleeve portion member 13 may be threaded to receive a suitable fastener 18, such as a nut or the like, to firmly hold the socket member 4 in engagement with the support panel 6.

Mounting of the socketlike member 4 on cardboard or plastic, the materials from which most glove compartments are made, will not allow the device to work. To maintain the base portion in tight secure engagement with the support member 6, suitable flat washers, such as at 20 and 22, may be mounted on opposite sides of the support panel 6. The sleeve portion 13 may also include a upper portion 24 which projects upwardly above the support panel 6 adapted to support the contact means thereon. As shown, the sleeve portion 13 includes a lengthwise extending axial bore 26 into which the stud portion 19 of the pluglike switch member 8 is disposed in the operable nongrounding position of the device.

Referring to FIG. 2, the switch member 8 preferably includes a handle portion 28 on which is mounted the stud portion 10. The upper or contact end of the stud portion 10 preferably includes an indented portion or annular recess 30 adapted for snap-action interlocking engagement with the contact means 12 to hold the pluglike switch member 8 in locked engagement within the socket member 4 and to selectively actuate the contact means 12 to an open position, which will be discussed in more detail hereinafter.

The contact means 12 preferably include a plurality of contact elements 40, 42 and 44 which are disposed in spaced, insulated relation from one another by insulating washers 46 and 48. Preferable, the contact elements 40, 42 and 44 and insulating washers 46 and 48 include apertures 50, 52, 54, 56 and 58, respectively, adapted to be disposed in aligned relation on the upwardly projecting portion 24 of the sleevelike member 13 to maintain the contact elements 40, 42 and 44 in superposed relation with respect to one another. As shown, one of the contact elements, such as 40, may include an upstanding locking element 60 which includes a reversed bend portion 62 adapted for interlocking engagement with the stud portion 10. Preferably, the reverse bend portion 62 includes a detentlike projection 64 disposed for engagement within the annular recess 30 to lock the pluglike switch member 8 in snap-action relation within the socketlike member 4. The locking element 60 may include a generally upright and resiliently deformable arm 66 which is adapted to be pivoted outwardly upon engagement with the stud portion 10. Preferably, the contact element 40 is mounted on the base portion 15 being insulated therefrom by an insulating washer 61.

The contact element 42 preferably includes a contact arm 68 which may be disposed in laterally spaced relationship with respect to the arm 66, and which may include a contact button 70 adjacent the upper end thereof for selective contact with the arm 66. In the form shown, the contact button 70 is disposed in contact with the arm 66 when the pluglike switch member 8 is removed, whereas, the arm 66 is pivoted outwardly, and then, the contact button 70 will be disengaged from the arm 66 when the switch member 8 is in the installed position.

The upper contact element 44 is disposed adjacent the upper end of the sleevelike member 13 and adapted for interlocking engagement therewith to hold the contact elements in the aligned installed position on the sleeve portion 13. Preferably, the upper marginal edge of the sleeve portion 13 is bent back in overlying relation with respect to the marginal edge of the aperture 54 in the contact element 44 to provide a rivetlike attachment for electrical connection thereto.

Preferably, each of the contact elements 40, 42 and 44 may include contact lugs 72, 74, and 76, respectively, which are adapted for electrical connection to one another and/or portions of the ignition system. Therefore, by interconnecting the lugs 72 and 76, the contact element 40 may electrically connect to the sleeve portion 13, and thus, to ground the same to the motor vehicle framework.

Referring now to FIG. 3 there is illustrated, generally at 80, a schematic diagram of a typical electrical circuit which may be employed in the present invention. As illustrated, the diagram illustrates the condition of the circuit with the pluglike switch member 8 removed. As shown, the grounded sleeve portion 13 of the socket member 4 may be electrically connected to the contact lugs, such as by conductor 78 so that when the contact button 70 of the contact element 42 is in engagement with the contact element 40 the contact lug 74 of the contact element 42 will provide a grounded contact for connection to the ignition system of the motor vehicle engine, illustrated generally at 82.

For purposes of illustration, the ignition system 82 is shown as including an ignition coil having a primary winding 84 and a secondary winding 86. As shown, the ignition coil primary 84 is electrically connected to the points, such as at 88, of the distributor 90. To effectuate the grounding of the primary of the ignition coil, a single conductor, such as at 92, may be connected to the contact lug 74 and between the ignition coil 84 and the distributor points 88, such as at 93. As long as the switching member 8 is removed from the socket member 4 and the conductor 92 is intact, the engine cannot be started, such as by "hot wiring" or by the use of ignition keys.

In a typical operation of the device, the switching member 8 is simply pulled out of the socket member 4, and may be maintained on the person of the operator until it is desired to start the engine. When the operator of the car desires to start the engine, he simply plugs the switching member 8 back into the socket member to disengage the contact button 70 of the contact element 40 from the contact element 42 to place the ignition system in the nongrounded condition.

I claim:
1. In a protective switch device for motor vehicles,
an ignition system including a battery,
an ignition switch,
an ignition spark coil and a distributor including distributor points,
said ignition coil having a primary and a secondary,
a socket member capable of concealment and adapted to be mounted in grounded relation on said motor vehicle,
a pluglike switching member adapted for insertion into said socket member,
said socket member including a plurality of contact elements disposed for selective electrical interconnection with one another,
said switching member including a stud portion adapted for coacting camming engagement with one of said contact members to enable disengagement from one other of said contact elements,
said one contact element being disposed for resilient interlocking engagement with said stud portion upon insertion into said socket member,
said other contact element being disposed in engagement with said one contact element being arranged for disengagement therefrom upon insertion of said stud portion into said socket member,
said socket member including a base portion mounted in grounded relation on said motor vehicle,
said one contact element being electrically connected in grounded relation to said base portion,
said other contact element being electrically connected to said ignition system between said ignition spark coil and said distributor points, and
said one contact element being pivotally mounted on said socket member and being movable into engagement with said other contact element upon removal of said switching member from said socket member for interconnecting said ignition system in grounded relation with said motor vehicle to prevent operation of said ignition system.

* * * * *